(12) United States Patent
Kiyama

(10) Patent No.: US 8,580,428 B2
(45) Date of Patent: Nov. 12, 2013

(54) BATTERY AND METHOD FOR MANUFACTURING THE SAME

(75) Inventor: Akira Kiyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 277 days.

(21) Appl. No.: 12/936,703

(22) PCT Filed: Mar. 27, 2009

(86) PCT No.: PCT/JP2009/056235
§ 371 (c)(1),
(2), (4) Date: Oct. 7, 2010

(87) PCT Pub. No.: WO2009/128335
PCT Pub. Date: Oct. 22, 2009

(65) Prior Publication Data
US 2011/0027644 A1 Feb. 3, 2011

(30) Foreign Application Priority Data
Apr. 14, 2008 (JP) ................................. 2008-104352

(51) Int. Cl.
*H01M 2/02* (2006.01)
*H01M 4/82* (2006.01)
*H01R 43/02* (2006.01)

(52) U.S. Cl.
USPC ............................ 429/181; 29/623.2; 29/879

(58) Field of Classification Search
USPC .................. 429/181; 29/623.2, 879
See application file for complete search history.

(56) References Cited

U.S. PATENT DOCUMENTS

2007/0298317 A1* 12/2007 Brodd et al. ............... 429/94
2009/0239139 A1 9/2009 Kozuki et al.

FOREIGN PATENT DOCUMENTS

| JP | 2002-8708 | 1/2002 |
| JP | 2004-63272 | 2/2004 |
| JP | 2004362956 A | * 12/2004 |
| JP | 2006-100214 | 4/2006 |
| JP | 2006-164713 | 6/2006 |
| JP | 2006-278013 | 10/2006 |
| WO | WO 2008/035495 A1 | 3/2008 |

OTHER PUBLICATIONS

International Search Report in International Application No. PCT/JP2009/056235; Mailing Date: May 26, 2009.

* cited by examiner

*Primary Examiner* — Karie O'Neill Apicella
(74) *Attorney, Agent, or Firm* — Finnegan, Henderson, Farabow, Garrett & Dunner, LLP

(57) ABSTRACT

A battery (100) provided by the present invention includes an electrode body (80) having a positive electrode and a negative electrode (84), a bottomed battery case (10) for holding the electrode body (80), and a current collecting plate (20) that connects the battery case (10) with either the positive electrode or the negative electrode of the electrode body. A part of the current collecting plate (20) and a bottom part (16) of the battery case (10) are fixed to each other by welding, and a sealed structure (40) that surrounds a weld (30) composed of a portion that has been welded is formed at the periphery of the weld (30).

12 Claims, 6 Drawing Sheets

BATTERY AND METHOD FOR MANUFACTURING THE SAME

TECHNICAL FIELD

This invention relates to a battery, and more particularly relates to a battery in which a current collecting plate and a battery case are joined by welding, and to a method for manufacturing this battery.

This international application claims priority right on the basis of Japanese Patent Application No. 2008-104352 submitted on Apr. 14, 2008, and the entire content of that application is incorporated by reference into this specification.

BACKGROUND ART

Recent years have seen rising demand for lithium ion batteries, nickel-hydrogen batteries, and other such secondary batteries as power sources installed in vehicles, as well as power supplies for personal computers and portable terminals. In particular, it is anticipated that lithium ion batteries can be used to advantage as high-output power supplies installed in vehicles because of their light weight and high energy density.

Among the lithium ion batteries of this type, a cylindrical battery, for example, has a positive electrode sheet and a negative electrode sheet coiled with a separator sheet in between, and the resulting coiled electrode body is housed in a metal battery case. A positive electrode current collecting plate and a negative electrode current collecting plate are attached respectively to the two ends of the coiled electrode body in the coiling axis direction (that is, one end is the positive electrode, and the other end is the negative electrode). Typically, the positive electrode current collecting plate is welded to the lid (positive electrode terminal) of the battery case, while the negative electrode current collecting plate is fixed by welding (such as resistance welding) to the bottom face of the battery case. With a battery of this form, since current can be taken out from the electrode body via the positive and negative current collecting plates, there is a reduction in collecting resistance, and charging and discharging efficiency can be improved. Patent Document 1 is an example of prior art related to this type of current collecting plate (and particularly a current collecting plate that is welded to the bottom face of a battery case).

Patent Document 1: Japanese Patent Application Laid-Open No. 2006-100214

With a battery configured as above, however, a problem is that welding spatter (such as metal particles that melt during welding and scatter in the form of sparks) and so forth and other such foreign matter tends to be produced in the welding of the current collecting plate to the bottom face of the battery case. When welding spatter or the like occurs, not only does it scatter around the periphery of the weld and adversely affect the welding quality, but it can work its way into the battery case through the gap between the current collecting plate and the battery case, where it can become a source of diminished battery performance, such as internal shorting of the electrode body. This type of welding spatter is difficult to detect when it occurs, and consequently it is currently impossible to prevent the scattering of this spatter merely by adjusting the welding conditions.

DISCLOSURE OF THE INVENTION

The present invention was conceived in light of this situation, and it is a main object thereof to provide a battery comprising a collecting structure with which the scattering of welding spatter and other such foreign matter (and particularly its working its way into the interior of the electrode body) during welding can be minimized. Also provided is a manufacturing method with which a battery having such performance can be stably manufactured.

The battery provided by the present invention comprises an electrode body having a positive electrode and a negative electrode, a bottomed battery case that holds the electrode body, and a current collecting plate that connects the battery case with either the positive electrode or the negative electrode of the electrode body. A part of the current collecting plate and a bottom part of the battery case are fixed to each other by welding. A sealed structure that surrounds a weld, which is composed of a portion that has been welded, is formed at the periphery of the weld.

With the constitution of the present invention, in a battery in which part of a current collecting plate and the bottom part of a battery case are fixed to each other by welding, a sealed structure that surrounds the weld is formed at the periphery of the weld, so the weld can be spatially isolated from the periphery of the electrode body. Consequently, the foreign matter that can be produced from the weld (the portion where the weld is formed) during welding (such as metal particles that melt during welding and scatter in the form of sparks) can be limited to the periphery of the weld, and can be prevented from scattering to the periphery of the electrode body. As a result, this avoids the problems caused when the foreign matter works its way into the interior of the electrode body (such as micro-shorting that occurs when such matter works its way in between the positive and negative electrodes of the electrode body). Also, since there is no need to worry about the scattering of welding spatter or the like, welding can be performed stably (with consistent quality) at a high output, so welding quality is improved and the internal resistance of the battery can be reduced. Specifically, with the constitution of the present invention, a sealed battery can be provided that has superior battery performance and also has high reliability.

In a preferred embodiment of the battery disclosed herein, a seal member disposed in a gap between the current collecting plate and the battery case is provided as part of the sealed structure. With this constitution, part of the sealed structure that is suited to the object of the present invention (a structure that prevents the scattering of spatter) can be constructed with a simple configuration in which a seal member is disposed in the gap between the current collecting plate and the bottom part of the battery case.

In another preferred embodiment of the battery disclosed herein, the current collecting plate has a protruding component that is a portion welded and fixed to the bottom part of the battery case and that protrudes to the side of the battery case. The seal member is disposed so as to surround the periphery of the protruding component. Thus providing a protruding component to the current collecting plate allows the welding of the current collecting plate and the bottom part of the battery case to be performed more easily (in a more stable state). In addition, foreign matter that has scattered to the periphery of the protruding component during welding can be effectively limited to being within the region bounded by the seal member, by a simple configuration in which the periphery of the protruding component is surrounded by the seal member.

In another preferred embodiment of the battery disclosed herein, the seal member is made of an elastic material, and is disposed in a state of being compressed (that is, press-fitted) in the gap between the current collecting plate and the battery case. With this constitution, the gap between the current collecting plate and the bottom part of the battery case (the gap through which foreign matter can scatter during welding) can be securely blocked off with the seal member because of its resiliency against compression. Consequently, a stronger sealed structure (a structure that prevents spatter scattering) can be constructed.

Also, with the above constitution, when a projection (protrusion) is provided to the portion of the current collecting plate where the weld is formed, and welding (typically projection welding) is performed, and when the current collecting plate provided with the projection (protrusion) is pressed against the bottom part of the battery case, the presence of the seal member squeezed between the current collecting plate and the battery case eliminates the problem of the current collecting plate sloping with the projection (protrusion) as the fulcrum. Consequently, the welding of the current collecting plate and the bottom part of the battery case can be performed in a stable state, and welding defects can be favorably reduced.

In another preferred embodiment of the battery disclosed herein, the current collecting plate has a flat component that makes contact with the seal member, and the flat component is disposed so as to be substantially parallel to the bottom part of the battery case. With this constitution, during welding, the current collecting plate and the bottom part of the battery case are disposed opposite each other and substantially parallel with the seal member sandwiched in between. Accordingly, welding can be performed in a stable state while adding a uniform load to the contact surface (welding surface) between the current collecting plate and the bottom part of the battery case. As a result, welding defects can be reduced, and variance in the welding quality between individual batteries can be suppressed.

In another preferred embodiment of the battery disclosed herein, the current collecting plate and the bottom part of the battery case are welded by resistance welding (preferably projection welding), laser welding, or electron beam welding. With this constitution, providing the sealed structure (a structure that prevents spatter scattering) at the periphery of the weld means that there is no need to worry about the scattering of welding spatter or the like, so the method that is best suited can be selected from among the above-mentioned welding methods.

The present invention also provides a method for manufacturing a battery that comprises an electrode body having a positive electrode and a negative electrode, a bottomed battery case that holds the electrode body, and a current collecting plate that connects the battery case with either the positive electrode or the negative electrode of the electrode body, the battery having a weld at which the current collecting plate and a bottom part of the battery case are fixed to each other by welding. With this manufacturing method, prior to performing the welding, a sealed structure, which surrounds a portion where the weld is formed, is formed at the periphery of the portion where the weld is formed.

With the manufacturing method of the present invention, since welding (electrical heating in the case of resistance welding) is performed after the sealed structure is formed surrounding the portion where the weld is to be formed, any foreign matter (such as welding spatter) that may be generated from the portion where the weld is formed during welding (typically the portion that softens or melts) can be limited to the area around the weld. This avoids the problem of scattered foreign matter (such as welding spatter) finding its way into the electrode body, and provides a more reliable battery.

In another preferred embodiment of the manufacturing method disclosed herein, the seal member that constitutes part of the sealed structure is disposed in a gap between the current collecting plate and the battery case. With this method, a sealed structure (a structure that prevents welding spatter) that is suited to the object of the present invention can be constructed by the simple means of disposing the sealed structure in the gap between the current collecting plate and the bottom of the battery case.

In another preferred embodiment of the manufacturing method disclosed herein, the current collecting plate has a protruding component that is a portion welded and fixed to the bottom part of the battery case and that protrudes to the side of the battery case. Prior to performing the welding, the protruding component is surrounded by the seal member. Providing the protruding component to the current collecting plate allows welding to be performed easily (in a stable state) between the current collecting plate and the bottom part of the battery case. In addition, foreign matter that has scattered to the periphery of the protruding component during welding can be effectively limited to being within the region bounded by the seal member, by the simple means of surrounding the periphery of the protruding component with the seal member.

In another preferred embodiment of the manufacturing method disclosed herein, the seal member is made of an elastic material. Also, prior to performing the welding (such as an electrical heat treatment), the seal member is disposed in a state of being compressed in the gap between the current collecting plate and the battery case. With this method, the gap between the current collecting plate and the bottom part of the battery case (a gap in which foreign matter can scatter during welding) can be securely blocked off by the seal member due to its resiliency against compression, and an even stronger sealed structure (a structure that prevents spatter scattering) can be constructed. It is good for the compression of the seal member to be accomplished by load produced when the current collecting plate is pressed against the bottom part of the battery case during welding.

In another preferred embodiment of the manufacturing method disclosed herein, the current collecting plate has a flat component that makes contact with the seal member. Also, in the welding, the current collecting plate is disposed at a specific location within the battery case so that the flat component becomes substantially parallel to the bottom part of the battery case. With this method, in welding, the current collecting plate and the bottom part of the battery case are disposed substantially parallel and opposite each other with the seal member in between. Accordingly, welding can be performed in a stable state while a uniform load is applied to the contact portion between the current collecting plate and the bottom part of the battery case (the portion where the weld is formed). As a result, there is an increase in welding quality, there are fewer welding defects, and variance can be suppressed in the welding quality between individual batteries.

In another preferred embodiment of the manufacturing method disclosed herein, after the sealed structure is formed, the weld is formed by welding the bottom part of the battery case and the part of the current collecting plate surrounded by the sealed structure by resistance welding, laser welding, or electron beam welding. With the constitution of the present invention, since a sealed structure (a structure that prevents spatter scattering) is provided around the periphery of the weld, there is no need to worry about the scattering of welding spatter or the like, and consequently the most suitable welding method can be selected from those mentioned above.

BEST MODE FOR CARRYING OUT THE INVENTION

Figure 1:
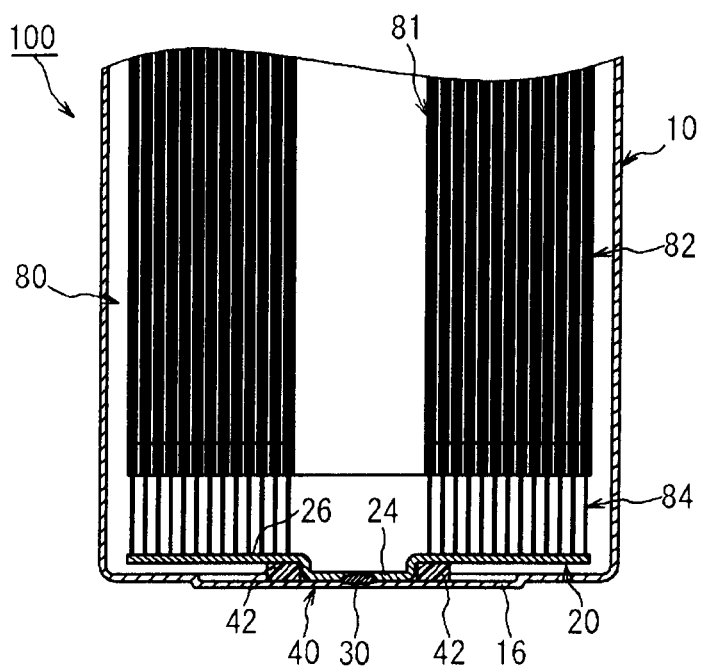
FIG. 1 is a cross section that schematically illustrates the main parts of the sealed battery pertaining to an embodiment of the present invention.

The best mode for carrying out the invention will now be described through reference to the drawings. In the following drawings, those components that have the same action are numbered the same. The structure of the battery of the present invention will now be described in detail by using a cylindrical lithium ion secondary battery as an example, but the present invention is not intended to be limited to what is stated in the embodiments. Also, the dimensional relationships in the drawings (length, width, thickness, etc.) do not reflect the actual dimensional relationships.

Figure 4:
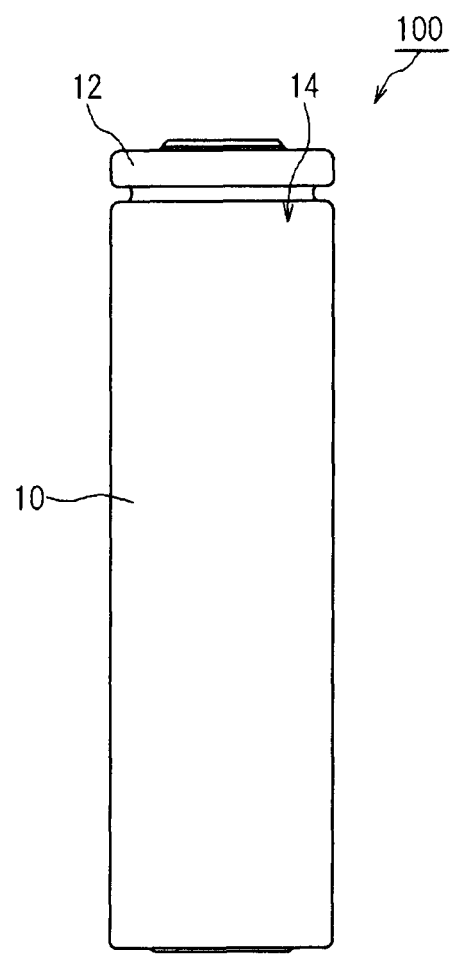
FIG. 4 is a schematic view of the appearance of the sealed battery pertaining to an embodiment of the present invention.

A lithium ion secondary battery 100 of this embodiment will be described through reference to FIG. 1. FIG. 1 is a cross section that schematically illustrates the main parts of the battery 100. The lithium ion secondary battery 100 pertaining to this embodiment is what is called a sealed battery, in which the internal space of the battery case is spatially isolated from the outside (hereinafter also referred to simply as a "battery") as shown in FIG. 4.

As shown in FIG. 1, the sealed battery 100 comprises an electrode body 80 equipped with a positive electrode and a negative electrode, a bottomed battery case 10 that houses the electrode body 80, and a current collecting plate 20 that connects the battery case 10 with either the positive electrode or the negative electrode of the electrode body 80.

The electrode body 80 is a coiled electrode body, for example, and can be formed by coiling a positive electrode sheet and a negative electrode sheet which are discussed below with a separator in between. The battery case 10 has a shape that allows it to hold the electrode body 80, and here it is a bottomed, cylindrical vessel (made of nickel-plated copper, for example) capable of housing a coiled electrode body. The current collecting plate 20 in this embodiment electrically is a negative electrode current collecting plate, for example, and connects the battery case 10 with the negative electrode 84 of the electrode body 80. Part of the negative electrode current collecting plate 20 and the bottom part 16 of the battery case battery case 10 are fixed to each other by welding. There are no particular restrictions on how the current collecting plate 20 and the battery case bottom part 16 are joined, but it is good if they are welded by either resistance welding (preferably projection welding), laser welding, or beam welding.

Figure 2:
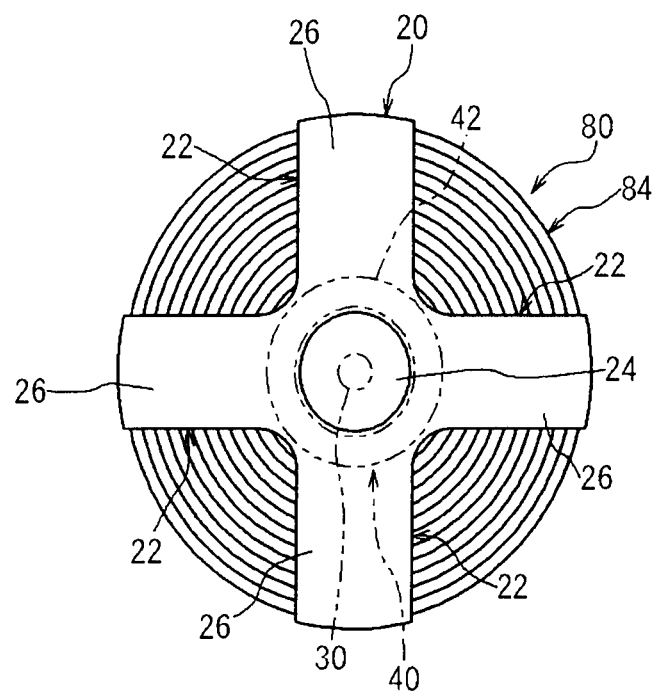
FIG. 2 is a bottom view of the sealed battery pertaining to an embodiment of the present invention.

The structure around the weld composed of the welded portions of the current collecting plate and the battery case bottom will now be described, also referring to FIG. 2. FIG. 2 is a bottom view of the battery in FIG. 1, in which part of the material constituting the battery (such as the battery case 10) is not shown.

As shown in FIG. 2, the negative electrode current collecting plate 20 is interposed between the battery case 10 and the negative electrode 84 of the coiled electrode body and conducts electricity between the two. The material of which the negative electrode current collecting plate 20 is made may be a material that can be welded to the negative electrode 84 (made of copper, for example) and the battery case 10 (made of nickel-plated copper, for example), and examples of such weldable materials include nickel, copper, and alloys thereof.

A weld 30 that is fixed by welding to the bottom part 16 of the battery case is formed on part of the negative electrode current collecting plate 20. In this embodiment, the negative electrode current collecting plate 20 has a protrusion 24 that sticks out on the battery case 10 side, and the distal end portion of the protrusion 24 (part of the protruding face) is welded to the bottom part 16 of the battery case. Also, cut-outs 22 that expose the end face (negative electrode) of the electrode body 80 are formed in the outer periphery of the negative electrode current collecting plate 20 (in FIG. 2, there are four fan-shaped cut-outs). Electrolyte can be supplied through these cut-outs to the electrode body 80.

When the negative electrode current collecting plate 20 provided with these cut-outs 22 is welded (by resistance welding, for example) to the bottom part 16 of the battery case, there is the risk that foreign matter generated from the weld 30 (such as welding spatter) will scatter through the cut-outs 22 to the periphery of the electrode body 80. Or, there is the risk that foreign matter generated from the weld 30 will adhere to the periphery of the weld 30, and when electrolyte is subsequently supplied through the cut-outs 22 to the electrode body 80, the adhered foreign matter will work its way into the interior of the electrode body 80 along with the electrolyte. It is undesirable for foreign matter to thus find its way into the electrode body, because micro-shorting or the like may be caused when the foreign matter comes between the positive and negative electrodes of the electrode body.

In this embodiment, a sealed structure 40 that spatially surrounds the periphery of the weld 30 composed of the welded portion (the portion where the weld is formed) is formed at the periphery of the weld 30, which prevents welding spatter or other such foreign matter from scattering to the periphery of the electrode body 80 (and particularly from working its way into the interior of the electrode body). Specifically, the sealed structure 40, which surrounds the periphery of the weld 30 composed of the welded portion (and preferably seals the weld 30 spatially), is formed at the periphery of the weld 30.

In this embodiment, a seal member 42 is provided as part of the sealed structure 40. Specifically, in this embodiment the sealed structure 40 is formed by spatially surrounding the periphery of the weld 30 composed of the welded portion with the seal member 42, part of the battery case bottom part 16, and part of the current collecting plate 20 (and preferably by sealing the weld 30).

The seal member 42 is disposed in the gap between the current collecting plate 20 and the bottom part 16 of the battery case 10, and blocks off the gap formed according to how far the protrusion 24 sticks out. In this embodiment, the seal member 42 is an annular gasket that surrounds the periphery of the protrusion 24 (and particularly the weld 30). The material of which the seal member 42 is made is preferably one that is resistant to both heat and electrolyte, and more preferably an elastic material with suitable elasticity. Imparting suitable elasticity to the seal member 42 allows the seal member 42 to be disposed in a compressed state in the gap between the current collecting plate 20 and the battery case 10, and allows the gap between the current collecting plate 20 and the battery case 10 (specifically, the gap through which metal particles and other such welding spatter can scatter during welding) to be tightly blocked off by the resiliency of the seal member 42 against compression. Consequently, a stronger sealed structure 40 (a structure that prevents spatter scattering) can be constructed. Examples of the material of which this seal member 42 is made include ethylene-propylene rubber (EPDM, etc.), polypropylene (PP), polyethylene (PE), fluororesins PFA, etc.), and other such resin materials.

With the constitution of this embodiment, in the battery 100 in which part of the current collecting plate 20 and the bottom part 16 of the battery case are fixed to each other by welding, since the sealed structure 40 that spatially surrounds the periphery of the weld 30 is formed around the periphery of the weld 30, the weld 30 can be spatially isolated from the electrode body 80. Consequently, foreign matter that may be generated from the weld (the portion where the weld is formed) during welding (such as metal particles and other such welding spatter that scatters in the form of sparks during welding) can be limited to the weld periphery, and this foreign matter can be prevented from scattering to the periphery of the electrode body. As a result, this avoids the problems caused when the foreign matter works its way into the electrode body (such as micro-shorting due to foreign matter finding its way between the positive and negative electrodes of the electrode body).

Also, since there is no need to worry about the scattering of welding spatter or the like, welding can be performed stably (with consistent quality) at a high output, so welding quality can be improved and the internal resistance of the battery reduced. Specifically, with the constitution of the present invention, a sealed battery can be provided that has excellent battery performance and high reliability.

Also, in this embodiment, the seal member 42, which is disposed in the gap between the current collecting plate 20 and the bottom part 16 of the battery case, is provided as part of the sealed structure 40. With this constitution, that is, a constitution in which the seal member 42 is disposed in the gap between the current collecting plate 20 and the bottom part 16 of the battery case, part of the sealed structure 40 that is suited to the object of the present invention (a structure that prevents spatter scattering) can be easily constructed.

Furthermore, with this embodiment, the current collecting plate 20 has the protrusion 24 that sticks out on the battery case 10 side and is a member that is welded to the bottom part 16 of the battery case. The seal member 42 is disposed so as to surround the periphery of the protrusion 24. Thus providing the protrusion 24 to the current collecting plate 20 makes it easy to position the place where the current collecting plate 20 and the battery case 10 are welded, and allows the welding of the current collecting plate 20 and the bottom part 16 of the battery case to be carried out with ease (and in a stable state). In addition, a constitution that makes it easy for the periphery of the protrusion 24 to be surrounded by the seal member effectively keeps any foreign matter that scatters at the periphery of the protrusion during welding within the region bounded by the seal member.

The sealed structure 40 may be formed at the periphery of the weld 30 (the portion where the weld is formed) so that foreign matter that may be generated from the weld 30 can be kept to the weld periphery, and to give an example, may be formed so as to surround the periphery of the weld 30 (and preferably seal the weld 30). Therefore, the member used to construct the sealed structure 40 may be selected according to the weld and its peripheral structure (such as the shape of the current collecting plate, the shape of the battery case, and the number of welds). For instance, the seal member 42 may be formed so that, by being combined with part of the current collecting plate 20 and part of the battery case 10, foreign matter that may be generated from the weld 30 can be kept to the weld periphery, and therefore the shape of the seal member 42 is not limited to a shape (annular gasket, here) that surrounds the periphery of the protrusion 24 as discussed above, and may be some other shape instead. Also, when the current collecting plate 20 and the battery case 10 are welded at a plurality of sites, a sealed structure surrounding each individual weld may be formed at a plurality of sites, or a single sealed structure may be formed that surrounds the entire region including a plurality of welds as a whole.

Another characteristic portion of the negative electrode current collecting plate 20 pertaining to this embodiment will now be described. In this embodiment, the negative electrode current collecting plate 20 is a flat member formed in the shape of a cross. The negative electrode current collecting plate 20 is constituted by the protrusion 24 disposed in the center portion, and a flat component 26 extending to the outer peripheral side from the protrusion 24. The protrusion 24 is fixed by welding to the battery case bottom 16 as discussed above. The protruding face of the protrusion 24 is preferably formed flat. This improves joint strength with the battery case 10.

The flat component 26 has a part that is welded to the negative electrode 84 of the coiled electrode body. In the example in FIG. 1, part of the upper face of the flat component is welded to the negative electrode 84 of the coiled electrode body. The portion welded to the negative electrode 84 of the coiled electrode body is preferably formed flat in this manner. This improves joint strength with the negative electrode 84 of the coiled electrode body.

The flat component 26 has a part that is in contact with the seal member 42. In the example in FIG. 1, part of the lower face of the flat component is in contact with the seal member 42. It is preferable for the portion in contact with the seal member 42 thus to be formed flat and to be disposed so as to be substantially parallel to the bottom part 16 of the battery case. With this constitution, the current collecting plate 20 and the bottom part 16 of the battery case are disposed opposite each other with the seal member 42 in between during welding. Accordingly, welding can be performed in a stable state while adding a uniform load to the contact surface (welding surface) between the current collecting plate 20 and the bottom part 26 of the battery case. As a result, welding quality is improved, there are fewer welding defects, and variance in the welding quality between individual batteries can be suppressed.

Figure 3A:
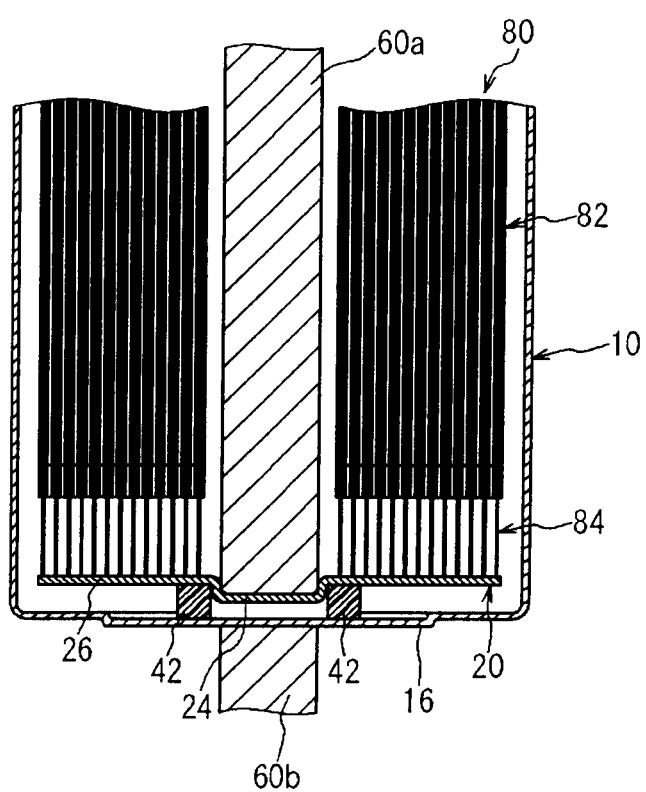
FIG. 3A is a cross section that schematically illustrates the state prior to the welding of the current collecting plate and the bottom part of the battery case pertaining to an embodiment of the present invention.
Figure 3B:
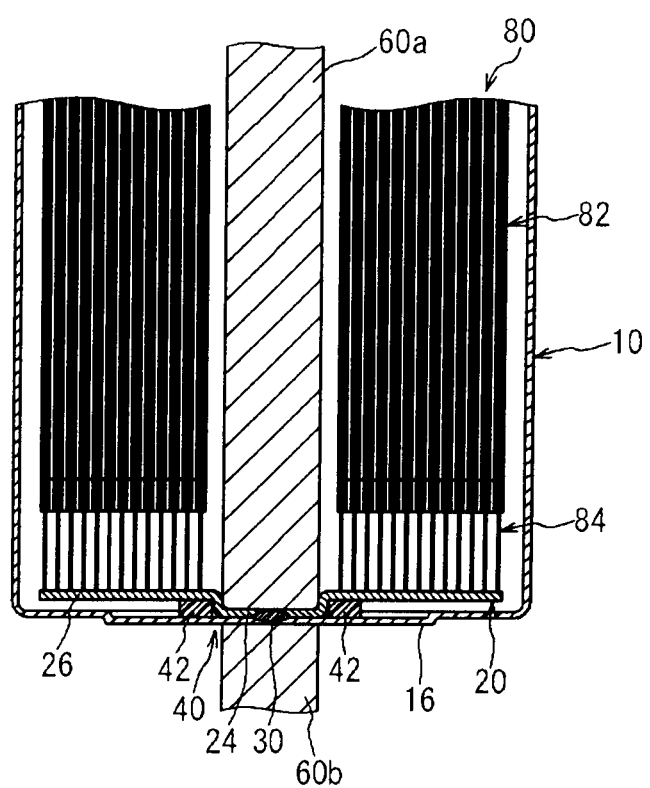
FIG. 3B is a cross section that schematically illustrates the state after the welding of the current collecting plate and the bottom part of the battery case pertaining to an embodiment of the present.

Next, the process of welding the current collecting plate 20 and the bottom part 16 of the battery case will be described through reference to FIGS. 3A and 3B. FIG. 3A is the state prior to the welding of the current collecting plate 20 and the battery case bottom part 16, and FIG. 3B is the state after the welding of the current collecting plate 20 and the battery case bottom part 16. Here, a case in which the current collecting plate 20 is joined by resistance welding to the battery case 10 will be described as an example.

First, as shown in FIG. 3A, prior to welding, the layout is such that the periphery of the protrusion 24 is surrounded by the seal member 42. In this embodiment, the protrusion 24 of the current collecting plate 20 is passed through the center hole of the annular seal member 42 and disposed so that the distal end (protruding face) of the protrusion 24 is opposite the upper face of the battery case bottom part 16. The current collecting plate 20 here is preferably disposed at a specific location within the battery case 10 (near the center of the bottom part 16 in the drawings) so that the flat component 26 of the current collecting plate becomes substantially parallel to the bottom part 16 of the battery case with the seal member 42 in between. The thickness of the annular seal member 42 is slightly greater than the amount by which the protrusion 24 protrudes, so the distal end of the protrusion 24 and the bottom part 16 of the battery case can be disposed spaced apart by a specific gap.

Next, a rod-shaped electrode 60a is inserted into the battery case 10, and the distal end of the rod-shaped electrode 60a hits the rear face (concave face) of the protrusion 24 via a hollow portion in the coiled electrode body 80. Another rod-shaped electrode 60b hits the rear face (the lower face in the drawing) of the bottom part 16 of the battery case.

Next, as shown in FIG. 3B, the distal end (protruding face) of the protrusion 24 and the upper face of the battery case bottom part 16 are brought into contact by being pressed on by the rod-shaped electrodes 60a and 60b at a suitable pressing force. At this point, the seal member 42 is disposed in a compressed state in the gap between the current collecting plate 20 and the battery case 10 by a suitable pressing force from the rod-shaped electrodes 60a and 60b. The gap between the current collecting plate 20 and the battery case 10 is securely sealed by the seal member 42 due to its resiliency against this compression, and this constructs a sealed structure 40 in which the periphery of the protrusion 24 (the portion where the weld 30 is formed) is surrounded by part of the current collecting plate 20, part of the battery case bottom 16, and the seal member 42. Thus, prior to welding, the sealed structure 40 that surrounds the portion where the weld 30 is to be formed is formed at the periphery of the portion where the weld 30 is to be formed.

After the sealed structure 40 has thus been formed, the bottom part 16 of the battery case and part of the current collecting plate 20 surrounded by the sealed structure 40 are welded by resistance welding, which forms the weld 30. In this embodiment, current is passed between the electrodes under suitable pressing by the rod-shaped electrodes 60a and 60b. When this is done, the contact portion between the protrusion 24 and the battery case bottom part 16 enters a local state of softening or melting due to resistance heating caused by the passage of current, and the components are pressed together and integrated under the pressing force from the rod-shaped electrodes 60a and 60b. Here, foreign matter such as welding spatter is generated from the portion that is in a softened or molten state (the portion where the weld 30 is formed), but in this embodiment the sealed structure 40 (in this example, the structure surrounded by part of the current collecting plate 20, part of the battery case bottom 16, and the seal member 42) limits the foreign matter to the periphery of the weld 30.

After this, the pressure and current application are stopped to solidify the molten portion, which forms the weld 30 in which part of the current collecting plate 20 and the bottom part 16 of the battery case 10 are fixed to each other by welding. In this way, part of the current collecting plate 20 and the bottom part 16 of the battery case can be fixed and welded by resistance welding.

With the manufacturing method of this embodiment, since welding (heating by electrical conduction) is performed after forming the sealed structure 40 that surrounds the portion where the weld 30 is to be formed, any foreign matter (such as welding spatter) that may be generated from the portion where the weld 30 is formed during welding (typically the portion that softens or melts) can be limited to the periphery of the weld 30. This avoids the problems caused when scattered foreign matter (such as welding spatter) works its way into the interior of the electrode body, and allows a sealed battery 100 with high reliability to be provided. Also, since there is no need to worry about the scattering of welding spatter or the like, welding can be performed stably (with consistent quality) at a high output, so welding quality is improved and the internal resistance of the battery can be reduced. Furthermore, in this embodiment, the seal member 42, which constitutes part of the sealed structure 40, is disposed in the gap between the current collecting plate 20 and the battery case 10, and the seal member 42 is compressed by the load exerted when the current collecting plate 20 is pressed against the bottom part 16 of the battery case. With this constitution, a strong sealed structure (a mechanism that prevents welding spatter) can be constructed by the simple means of disposing the sealed structure 42 in the gap between the current collecting plate 20 and the bottom of the battery case 10.

Furthermore, with this embodiment, the current collecting plate 20 has the flat component 26 that makes contact with the seal member 42. In the above-mentioned welding, the current collecting plate 20 is disposed at a specific position within the battery case 10 so that the flat component 26 becomes substantially parallel to the bottom part 16 of the battery case. With this method, in welding, the current collecting plate 20 and the bottom part 16 of the battery case are disposed opposite each other and substantially parallel, with the seal member 42 in between. Accordingly, welding can be performed in a stable state while applying a uniform load to the contact portion between the current collecting plate 20 and the battery case bottom part 16 (the portion where the weld is formed). As a result, welding quality is improved, there are fewer welding defects, and variance can be suppressed in the welding quality between individual batteries.

In the above example, a case was described in which the current collecting plate 20 and the battery case 10 were joined by resistance welding, but the present invention is not limited to this, and another method besides above-mentioned welding can be used to advantage, such as projection welding, laser welding, or beam welding. In particular, when a projection (protrusion) is provided to the portion of the current collecting plate 20 where the weld is formed (the protruding component of the current collecting plate 20, here), and welding (typically projection welding) is performed, and when the current collecting plate 20 provided with the projection (protrusion) is pressed against the bottom part 16 of the battery case, the presence of the seal member 42 squeezed between the current collecting plate 20 and the battery case 10 (that is the resilience resulting from elasticity) eliminates the problem of the current collecting plate sloping with the projection (protrusion) as the fulcrum. Consequently, the projection welding of the current collecting plate 20 and the bottom part 16 of the battery case can be performed in a stable state, and welding defects can be favorably reduced.

Nest, the constitution of the sealed battery 100 that can be used in this embodiment, and the various materials and so forth that constitute the sealed battery, will be described in detailed, referring also to FIG. 4. FIG. 4 is a schematic view of the appearance of the sealed battery 100. The battery 100 pertaining to this embodiment is similar to a conventional battery in that it typically comprises an electrode body 80 equipped with specific battery constituent materials (the active materials of the positive and negative electrodes, the current collecting plates of the positive and negative electrodes, separators, and so forth), and the battery case 10 that holds the electrode body 80 and a suitable electrolyte.

As shown in FIG. 4, the battery case 10 is a bottomed vessel having a shape that can house the coiled electrode body 80 (which is in the form of a bottomed cylinder here). The battery case 10 has an opening 14 at one end (the upper end in FIG. 1), and is able to house the electrode body 80 via this opening 14. The material constituting the battery case 10 is preferably a metal material that is lightweight and has good electrical conductivity. Examples of such metal materials include aluminum, stainless steel, and nickel-plated copper. In this embodiment, the battery case 10 is formed by working a sheet of nickel-plated copper into the form of a bottomed cylinder. A lid 12 is attached via a gasket (not shown) to the opening 14 of the battery case 10. The constituent material of the lid 12 is preferably a metal material that is lightweight and has good electrical conductivity. In this embodiment, an aluminum lid can be used favorably.

The electrode body 80 that is housed in the battery case 10 is similar to the electrode body installed in a typical lithium-ion battery in that it has the same specific battery constituent materials (the active materials of the positive and negative electrodes, the current collecting plates of the positive and negative electrodes, separators, and so forth). In this embodiment, the electrode body 80 is a coiled electrode body (an electrode body with a spiral shape). As shown in FIG. 1, the coiled electrode body 80 is formed by laminating a positive electrode sheet and a negative electrode sheet along with two separators, and then coiling this assembly by using a core 81 having a hollow cylindrical shape. In this coiling, the positive electrode sheet and negative electrode sheet are coiled while offset somewhat in the width direction with respect to the coiling direction of the coiled electrode body 80, and as a result, parts of the ends of the positive electrode sheet and negative electrode sheet stick outside from a coil core 82 (that is, the portion where the positive electrode active material layer formation portion of the positive electrode sheet, the negative electrode active material layer formation portion of the negative electrode sheet, and the separators are densely coiled). Although not shown in the drawings, on the positive electrode side, the positive electrode current collecting plate (not shown) is provided to the portion that sticks out (that is, the portion where the positive electrode active material layer is not formed), and is electrically connected to the lid 12 (the positive electrode terminal in this embodiment). Meanwhile, on the negative electrode current collecting plate 20 is provided as above to the protruding portion (that is, the portion where the negative electrode active material layer is not formed), and is electrically connected to the battery case 10 (the negative terminal in this embodiment).

There are no particular restrictions on the method for joining the current collecting plate 20 with the negative electrode-side protruding portion (the negative electrode of the coiled electrode body) 84, but these components can be easily joined by laser welding, for example. In this embodiment, the upper face of the current collecting plate 20 is joined and fixed by laser welding to the end face (the lower face in FIG. 1) of the negative electrode-side protruding portion. Nor are there any particular restrictions on the method for joining the current collecting plate 20 and the battery case bottom part 16, but these can be favorably welded and fixed by resistance welding (such as projection welding), laser welding, or beam welding.

In this embodiment, providing the sealed structure 40 (a structure that prevents spatter scattering) to the periphery of the weld 30 eliminates the need to worry about the scattering of welding spatter or the like, so the method that is best suited can be selected from among the above-mentioned welding methods.

The materials and members that constitute the coiled electrode body 80 may themselves be the same as those in the electrode body of a conventional lithium ion battery, and no particular restrictions are imposed thereon. For example, the positive electrode sheet can be formed by applying a lithium ion battery-use positive electrode active material layer over a slender positive electrode current collecting plate. Aluminum foil (as in this embodiment) or another metal foil suited to positive electrodes can be used favorably for the positive electrode current collecting plate. One or more types of material used in conventional lithium ion batteries can be used with no particular restrictions for the positive electrode active material. Favorable examples include $LiMn_2O_4$, $LiCoO_2$, and $LiNiO_2$.

Meanwhile, the negative electrode sheet can be formed by applying a lithium ion battery-use negative electrode active material layer over a slender negative electrode current collecting plate. Copper foil (as in this embodiment) or another metal foil suited to negative electrodes can be used favorably for the negative electrode current collecting plate. One or more types of material used in conventional lithium ion batteries can be used with no particular restrictions for the negative electrode active material. Favorable examples include graphite carbon, amorphous carbon, and other such carbon materials, lithium-containing transition metal oxides, and transition metal nitrides.

Examples of favorable separator sheets for use between the positive and negative electrodes include those made of a porous polyolefin resin. When an electrolyte in the form of a solid or a gel is used, a separator may be unnecessary (that is, in this case the electrolyte itself can function as a separator).

The electrode body housed in the battery case is not limited to the coiled type discussed above. For instance, the electrode body may be a laminated type in which positive electrode sheets and negative electrode sheets are alternately laminated along with separators (or a solid or gelled electrolyte that can function as a separator).

The electrolyte that is housed in the battery case 10 along with the electrode body is, for example, $LiPF_6$ or another such lithium salt. For instance, a suitable amount (such as a concentration of 1M) of $LiPF_6$ or another such lithium salt can be dissolved in a nonaqueous electrolyte such as a mixed solvent of diethyl carbonate and ethylene carbonate (in a weight ratio of 1:1, for example) and used as an electrolyte. The sealed battery 100 of this embodiment can be constructed by putting the coiled electrode body 80 in the battery case 10, filling with the above-mentioned electrolyte, and sealing.

Figure 5:
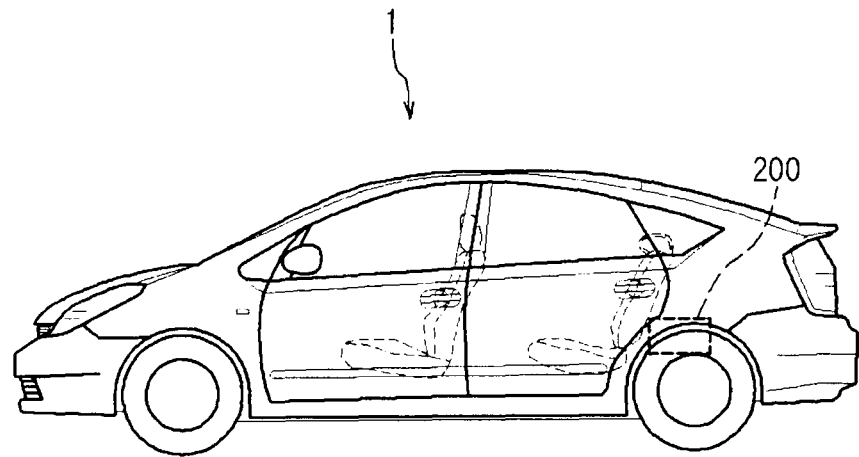
FIG. 5 is a side view that schematically illustrates a vehicle (automobile) equipped with the sealed battery pertaining to an embodiment of the present invention.

The sealed battery 100 pertaining to this embodiment can be used to particular advantage as a power supply for a motor (electric motor) installed in an automobile or other such vehicle. Specifically, as shown in FIG. 5, the batteries 100 pertaining to this embodiment are arranged in a specific direction as cells, and these cells are bound in their layout direction to construct a battery pack 200, and a vehicle 1 (typically an automobile, and especially an automobile equipped with an electric motor, such as a hybrid automobile, an electric automobile, or a fuel cell automobile) equipped with this battery pack as its power supply can be provided.

Figure 6:
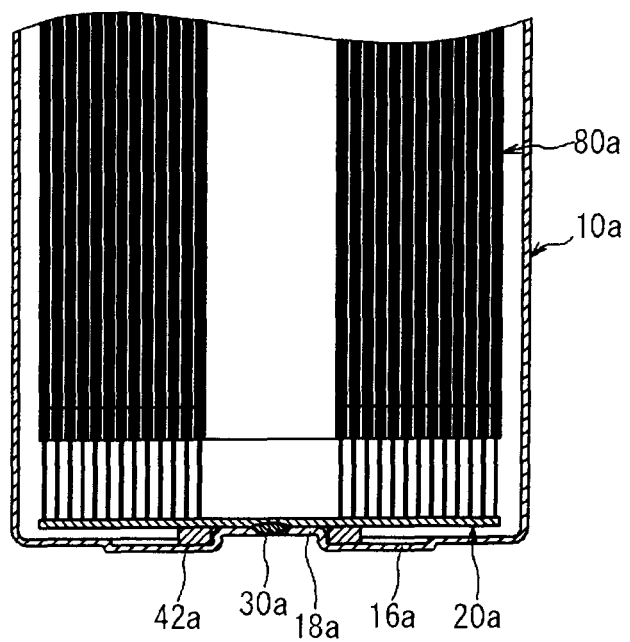
FIG. 6 is a cross section that schematically illustrates the main parts of the sealed battery pertaining to another embodiment of the present invention.

The present invention was described above by giving a preferred embodiment, but what is given above is not intended to be limiting in nature, and various modifications are of course possible. For example, in the example shown in FIG. 1, the protrusion 24 of the current collecting plate 20 is joined by resistance welding to the battery case bottom part 16, but the present invention is not limited to this. For instance, as shown in FIG. 6, a protrusion 18a that protrudes to a current collecting plate 20a side may be formed on a battery case bottom part 16a, and the protrusion 18a and the flat current collecting plate 20a may be joined by welding (such as laser welding) from the outside of the battery case 10a. Again with the structure shown in FIG. 6, foreign matter can be prevented from entering the electrode body 80a during welding by forming a sealed structure 40 that seals the periphery of the weld 30 (in the drawing, a structure that surrounds the periphery of the protrusion 18a (and particularly the weld 30a) with the current collecting plate 20a, the battery case bottom part 16a, and a seal member 42a) around the periphery of the weld 30.

Also, the type of sealed battery is not limited to the above-mentioned lithium ion battery, and batteries of various contents, with different electrolytes or electrode body constituent materials, may be used, such as a lithium secondary battery in which the negative electrode is made of lithium alone or a lithium alloy, a nickel hydrogen battery, a nickel cadmium battery, or an electric double-layer capacitor. Also, a case in which the electrode case constituted the negative electrode terminal was described in the above example, but if the electrode case instead constitutes the positive electrode terminal the same constitution will yield the same action and effect.

Industrial Applicability

With the constitution of the present invention, there can be provided a battery comprising a current collecting structure with which the scattering of welding spatter or other such foreign matter (and particularly its infiltration into the electrode body) during welding can be suppressed.

The invention claimed is:

1. A battery, comprising:
   an electrode body having a positive electrode and a negative electrode;
   a bottomed battery case that holds the electrode body; and
   a current collecting plate that connects the battery case with either the positive electrode or the negative electrode of the electrode body;
   wherein:
   a cut-out that exposes an end face of the electrode body is formed in the current collecting plate,
   a part of the current collecting plate and a bottom part of the battery case are fixed to each other by welding,
   the periphery of a weld composed of a portion that has been welded is formed with a sealed structure in which a seal member made of an elastic material is disposed so as to surround the periphery of the weld, and the weld is spatially isolated from the periphery of the electrode body including the cut-out of the current collecting plate by the seal member, and
   the seal member is disposed in a state of being compressed in a gap between the current collecting plate and the battery case.

2. The battery according to claim 1, wherein the current collecting plate has a protruding component that is a portion welded and fixed to the bottom part of the battery case and that protrudes to the side of the battery case, and the seal member is disposed so as to surround the periphery of the protruding component.

3. The battery according to claim 1, wherein the current collecting plate has a flat component that makes contact with the seal member, and the flat component is disposed so as to be substantially parallel to the bottom part of the battery case.

4. The battery according to claim 1, wherein the part of the current collecting plate and the bottom part of the battery case are welded by resistance welding, laser welding, or electron beam welding.

5. A method for manufacturing a battery that includes an electrode body having a positive electrode and a negative electrode, a bottomed battery case that holds the electrode body, and a current collecting plate that connects the battery case with either the positive electrode or the negative electrode of the electrode body, the battery having a weld at which a part of the current collecting plate and a bottom part of the battery case are fixed to each other by welding,
   wherein a cut-out that exposes the end face of the electrode body is formed in the current collecting plate,
   wherein, prior to performing the welding, a sealed structure is formed at the periphery of a weld composed of a portion that has been welded, the sealed structure being a structure in which a seal member made of an elastic material is disposed so as to surround the periphery of the weld, and a portion where the weld is formed is spatially isolated from the periphery of the electrode body including the cut-out of the current collecting plate by the seal member, and
   wherein, prior to performing the welding, the seal member is disposed in a state of being compressed in a gap between the current collecting plate and the battery case.

6. The manufacturing method according to claim 5, wherein the current collecting plate has a protruding component that is a portion welded and fixed to the bottom part of the battery case and that protrudes to the side of the battery case, and
   prior to performing the welding, the protruding component is surrounded by the seal member.

7. The manufacturing method according to claim 5, wherein the current collecting plate has a flat component that makes contact with the seal member, and
   in the welding, the current collecting plate is disposed at a specific location within the battery case so that the flat component becomes substantially parallel to the bottom part of the battery case.

8. The manufacturing method according to claim 5, wherein, after the sealed structure is formed, the weld is formed by welding the bottom part of the battery case and the part of the current collecting plate surrounded by the sealed structure by resistance welding, laser welding, or electron beam welding.

9. A vehicle comprising the battery according to claim 1.

10. A vehicle comprising a battery manufactured by the manufacturing method according to claim 5.

11. The battery according to claim 1, wherein the electrode current collecting plate is a flat member formed in the shape of a cross.

12. The battery according to claim 1, wherein the cut-out is a fan-shaped cut-out formed in the outer periphery of the electrode current collecting plate.

* * * * *